US010376100B2

(12) United States Patent
Yan et al.

(10) Patent No.: US 10,376,100 B2
(45) Date of Patent: Aug. 13, 2019

(54) SHUTOFF DEVICE FOR A TOASTER

(71) Applicant: Tsann Kuen (Zhangzhou) Enterprise Co., Ltd., Zhangzhou (CN)

(72) Inventors: Junlin Yan, Zhangzhou (CN); Yangtai He, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 349 days.

(21) Appl. No.: 15/141,067

(22) Filed: Apr. 28, 2016

(65) Prior Publication Data

US 2016/0316967 A1 Nov. 3, 2016

(30) Foreign Application Priority Data

Apr. 30, 2015 (CN) .................... 2015 2 0274963 U

(51) Int. Cl.
*A47J 37/08* (2006.01)

(52) U.S. Cl.
CPC ................................ *A47J 37/0814* (2013.01)

(58) Field of Classification Search
CPC ........ A47J 37/08; A47J 37/0814; H01H 13/02
USPC .......... 99/389–392, 325–328, 329 R, 329 RT
See application file for complete search history.

(56) References Cited

U.S. PATENT DOCUMENTS 5,097,751 A * 3/1992 Eisenberg ............. H01H 11/06 219/492
6,486,451 B1 * 11/2002 Nguyen ............. A47J 37/0814 219/386
2002/0047005 A1 * 4/2002 Nguyen ............. A47J 37/0814 219/392
2002/0073851 A1 * 6/2002 Chung ............... A47J 37/0814 99/327
2002/0113053 A1 * 8/2002 Nguyen ............. A47J 37/0814 219/386
2003/0172814 A1 * 9/2003 Arnedo .............. A47J 37/0814 99/327
2003/0213791 A1 * 11/2003 Guyett ............... A47J 37/0814 219/386
2004/0149141 A1 * 8/2004 Arnedo .............. A47J 37/0814 99/391
2010/0294136 A1 * 11/2010 Yip .................... A47J 37/0814 99/391
2012/0024165 A1 * 2/2012 Gao .................... A47J 37/0814 99/393
2014/0220210 A1 * 8/2014 Turner ............... A47J 37/0814 426/496

(Continued)

*Primary Examiner* — Dana Ross
*Assistant Examiner* — Joe E Mills, Jr.
(74) *Attorney, Agent, or Firm* — Burris Law, PLLC

(57) ABSTRACT

A shutoff device includes a guiding unit, a bread carriage connected movably to the guiding unit, a lever unit, and a switch. The bread carriage includes a first carriage body. The lever unit has a contact segment that has a lower portion disposed between first and second portions of the first carriage body, and an upper portion disposed above the lower portion and the first portion of the first carriage body. The lever unit is upwardly movable relative to the bread carriage, with the lower portion being moved toward the first portion of the first carriage body and the upper portion being moved away from the first portion of the first carriage body, thereby converting a contact portion of the switch from a contact position to a shutoff position.

7 Claims, 8 Drawing Sheets

(56) References Cited

U.S. PATENT DOCUMENTS

2014/0352549 A1 * 12/2014 Upston ................ A47J 37/085
99/334

* cited by examiner

SHUTOFF DEVICE FOR A TOASTER

CROSS-REFERENCE TO RELATED APPLICATION

This application claims priority of Chinese Application No. 201520274963.0, filed on Apr. 30, 2015.

FIELD

The disclosure relates to a shutoff device for a toaster, and more particularly to a shutoff device for a toaster that can cut off the power supply when a bread carriage is stuck.

BACKGROUND

FIG. 1 discloses a conventional shutoff device for a toaster, which includes a guiding shaft 11 extending in an up-down direction, a bread carriage 12, a lever unit 13 connected to and movable along the guiding shaft 11, and a resilient member 14 disposed between the bread carriage 12 and the lever unit 13.

The bread carriage 12 has a first carriage body 121 adjacent to the lever unit 13, and two second carriage bodies 122 respectively connected to lateral sides of the first carriage body 121 and extending away from the lever unit 13. The first carriage body 121 has upper and lower portions 123, 124 spaced apart from each other in the up-down direction and disposed respectively at upper and lower sides of the lever unit 13.

The lever unit 13 includes a contact body 131 disposed between the upper and lower portions 123, 124, a connecting body 132 connected to the contact body 131, an intermediate body 133 connected to the contact body 131, and a knob body 134 connected to the connecting body 132. The contact body 131 has a coupling wall 135, and two contact portions 136 formed respectively on top and bottom ends of the coupling wall 135, disposed between the upper and lower portions 123, 124, connected to and movable along the guiding shaft 11, and extending away from the bread carriage 12. The guiding shaft 11 extends through the upper portions 123 of the bread carriage 12, the contact portions 136 of the lever unit 13, and the lower portion 124 of the bread carriage 12. The knob body 134 is disposed at a top end of the connecting body 132. The resilient member 14 is disposed between the lower portion 124 of the bread carriage 12 and a lower one of the contact portions 136 of the lever unit 13.

The conventional shutoff device further includes a switch (not shown) convertible between a contact position, where the lever unit 13 electrically contacts the switch, and a shutoff position, where the lever unit 13 is separated from the switch.

In operation of the toaster, after a sliced bread is toasted, if the bread carriage 12 is stuck, since a first distance (D1) defined between the upper and lower portions 123, 124 is larger than a second distance (D2) defined between the contact portions 136, the contact body 131 is biased by the resilient member 14 to move upwardly relative to the first carriage body 121 such that the lever unit 13 is moved upwardly to be separated from the switch, and the switch converts to the shutoff position. However, the difference between the first distance (D1) and the second distance (D2) is not large, so that a moving distance of the lever unit 13 may be insufficient to ensure the conversion of the switch. In order to enlarge the moving distance of the lever unit 13, the first carriage body 121 has to be enlarged to lengthen the first distance (D1). However, the enlargement of the first carriage body 121 may affect arrangements of other elements inside of the toaster.

SUMMARY

Therefore, the object of the disclosure is to provide a shutoff device for a toaster that can completely cut off the power supply for safety and that facilitates structural design and manufacturing of the toaster.

According to the disclosure, the shutoff device is adapted for use in a toaster and includes a guiding unit, a bread carriage, a lever unit, and a switch. The guiding unit extends in an up-down direction. The bread carriage is connected to and movable along the guiding unit, and includes a first carriage body having a first portion and a second portion that is spaced apart from and disposed under the first portion. The lever unit has a contact segment adjacent to the first carriage body of the bread carriage, connected to and movable along the guiding unit, and having a lower portion that is disposed between the first and second portions of the first carriage body, and an upper portion that is spaced apart from the lower portion and that is disposed above the lower portion and the first portion of the first carriage body. The switch has a conduct portion, and a contact portion convertible between a contact position, where the contact portion electrically contacts the conduct portion, and a shutoff position, where the contact portion is separated from the conduct portion. The lever unit is downwardly movable to move the bread carriage downwardly, and to urge the contact portion of the switch to the contact position. The lever unit is upwardly movable relative to the bread carriage, with the lower portion being moved upwardly toward the first portion of the first carriage body and the upper portion being moved upwardly away from the first portion of the first carriage body, thereby converting the contact portion of the switch to the shutoff position.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
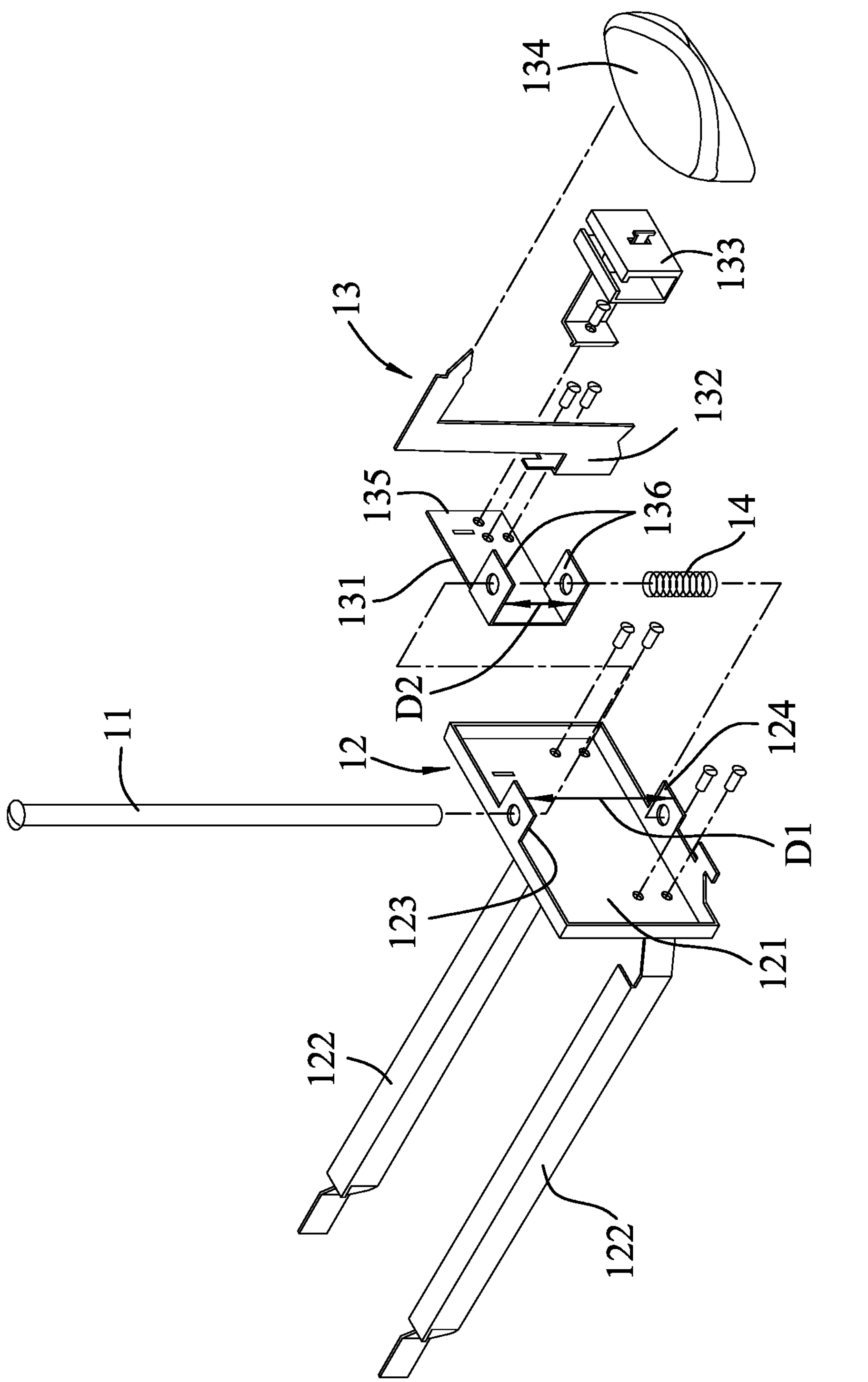
FIG. 1 is an exploded perspective view of a conventional shutoff device for a toaster.
Figure 2:
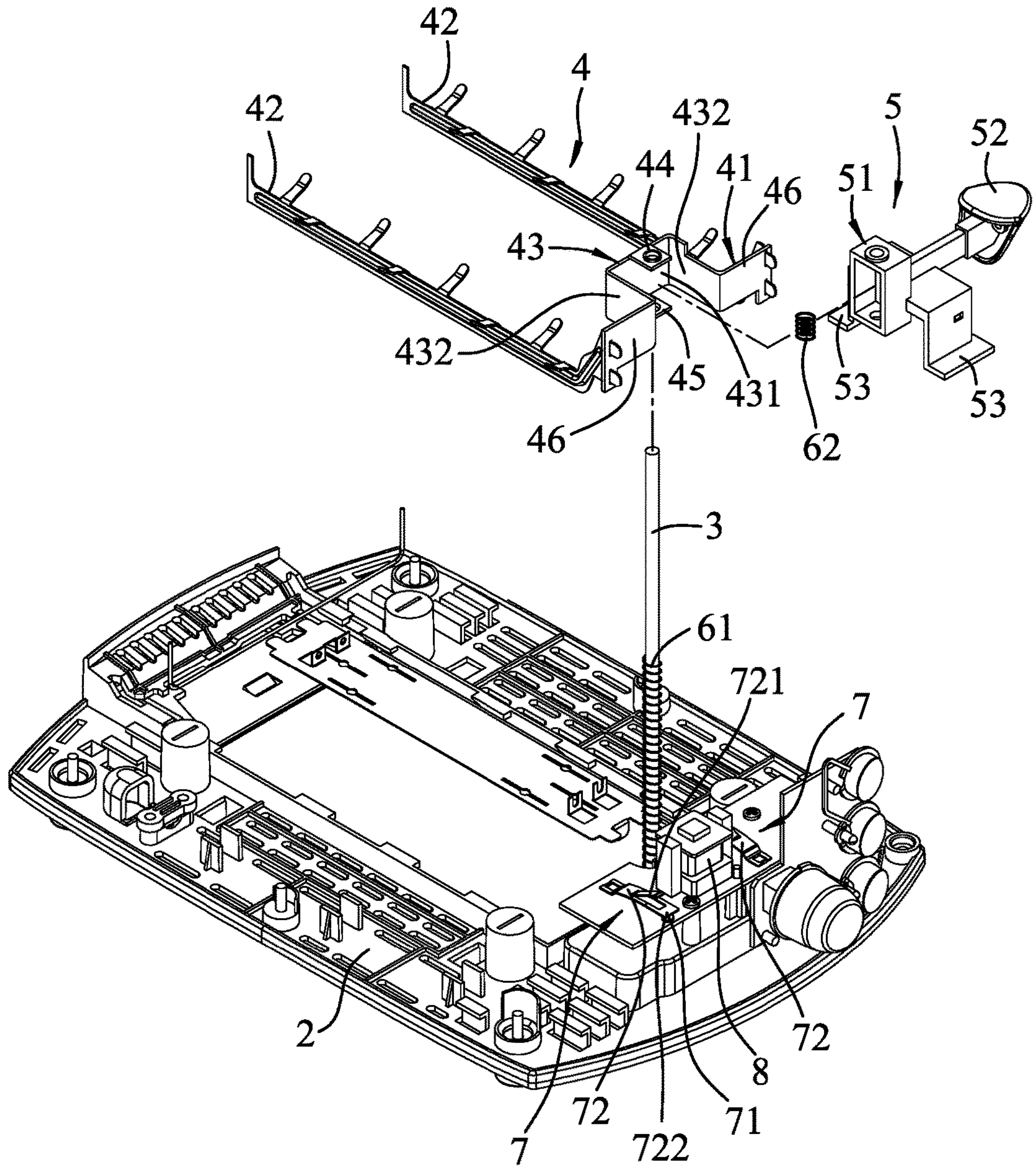
FIG. 2 is a partly exploded perspective view of an embodiment of a shutoff device for a toaster according to the disclosure.

Referring to FIGS. 2 to 5, the embodiment of the shutoff device is adapted for use in a toaster. The toaster includes a housing 2. The shutoff device includes a guiding unit 3, a bread carriage 4, a lever unit 5, a first resilient member 61, a second resilient member 62, two switches 7, and an electromagnet 8.

The guiding unit 3 is disposed in the housing 2, is configured as a shaft extending in an up-down direction, and has two ends that are respectively connected to a top portion and a bottom portion of the housing 2.

The bread carriage 4 is connected to and movable along the guiding unit 3, and includes a first carriage body 41 and two second carriage bodies 42. The first carriage body 41 has a U-shaped connecting portion 43 having a middle section 431 and two side sections 432 that are connected respectively to opposite ends of the middle section 431, a first portion 44 and a second portion 45 spaced apart from each other, and two coupling portions 46 connected respectively to the side sections 432 and parallel to the middle section 431. The first and second portions 44, 45 of the first carriage body 41 are connected respectively to top and bottom ends of the middle section 431 of the connecting portion 43 (i.e., the second portion 45 is disposed under the first portion 44). Each second carriage body 42 extends from a respective one of the coupling portions 46 of the first carriage body 41 away from the lever unit 5 and is adapted for supporting a piece of sliced bread (not shown) thereon.

In this embodiment, the lever unit 5 has a contact segment 51 adjacent to the first carriage body 41 of the bread carriage 4 and connected to and movable along said guiding unit 3, an accessible knob segment 52 connected to the contact segment 51 and extending out of the housing 2, two urging segments 53 connected between the contact segment 51 and the knob segment 52, and a bridge segment 54 connected between the urging segments 53. The contact segment 51 has a lower portion 512 disposed between the first and second portions 44, 45 of the first carriage body 41, and an upper portion 511 spaced apart from the lower portion 512 and disposed above the lower portion 512 and the first portion 44 of the first carriage body 41. The side sections 432 of the connecting portion 43 of the bread carriage 4 flank the contact segment 51 of the lever unit 5.

The first resilient member 61 is disposed between the bread carriage 4 and the bottom portion of the housing 2, and is disposed under the first carriage body 41 for biasing upwardly the first carriage body 41.

The second resilient member 62 has opposite top and bottom ends abutting resiliently and respectively against the contact segment 51 of the lever unit 5 and the first carriage body 41 for biasing upwardly the lever unit 5 relative to the bread carriage 4. It should be noted that, the second resilient member 62 may also be disposed between the lower portion 512 of the lever unit 5 and the second portion 45 of the bread carriage 4.

Specifically, the guiding unit 3 extends sequentially through the upper portion 511 of the contact segment 51 of the lever unit 5, the second resilient member 62, the first portion 44 of the first carriage body 41 of the bread carriage 4, the lower portion 512 of the contact segment 51 of the lever unit 5, the second portion 45 of the first carriage body 41 of the bread carriage 4, and the first resilient member 61.

Each of the switches 7 is disposed on the bottom portion of the housing 2, and has a conduct portion 71, and a contact portion 72 convertible between a contact position (see FIGS. 6 and 7), where the contact portion 72 electrically contacts the conduct portion 71, and a shutoff position (see FIGS. 4 and 5), where the contact portion 72 is separated from the conduct portion 71. In this embodiment, for each of the switches 7, the conduct portion 71 is made of metal and is disposed on a circuit board. Each of the contact portions 72 has a lower resilient piece 722, and an upper resilient piece 721 having one end that is connected to the lower resilient piece 722, and an opposite end that is spaced apart from the lower resilient piece 722. It should be noted that, in other embodiments, the shutoff device may include only one switch 7.

Figure 3:
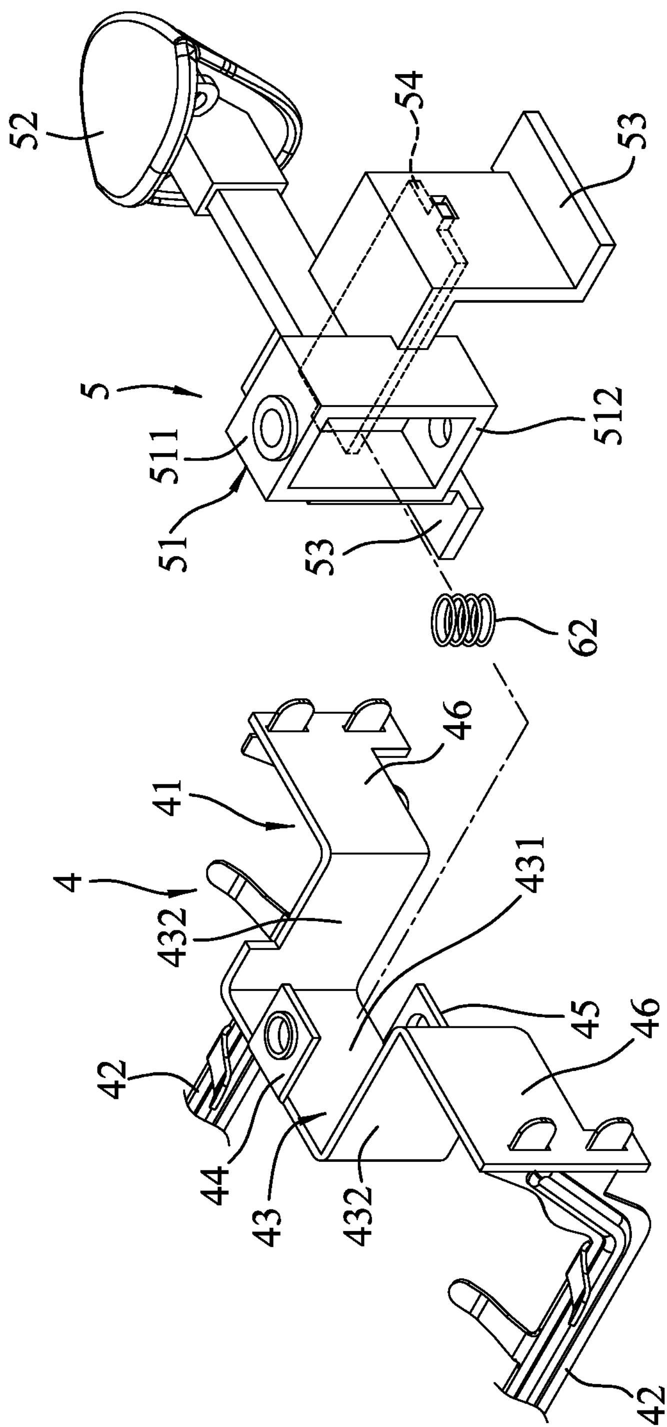
FIG. 3 is a fragmentary partly exploded perspective view of the embodiment.
Figure 4:
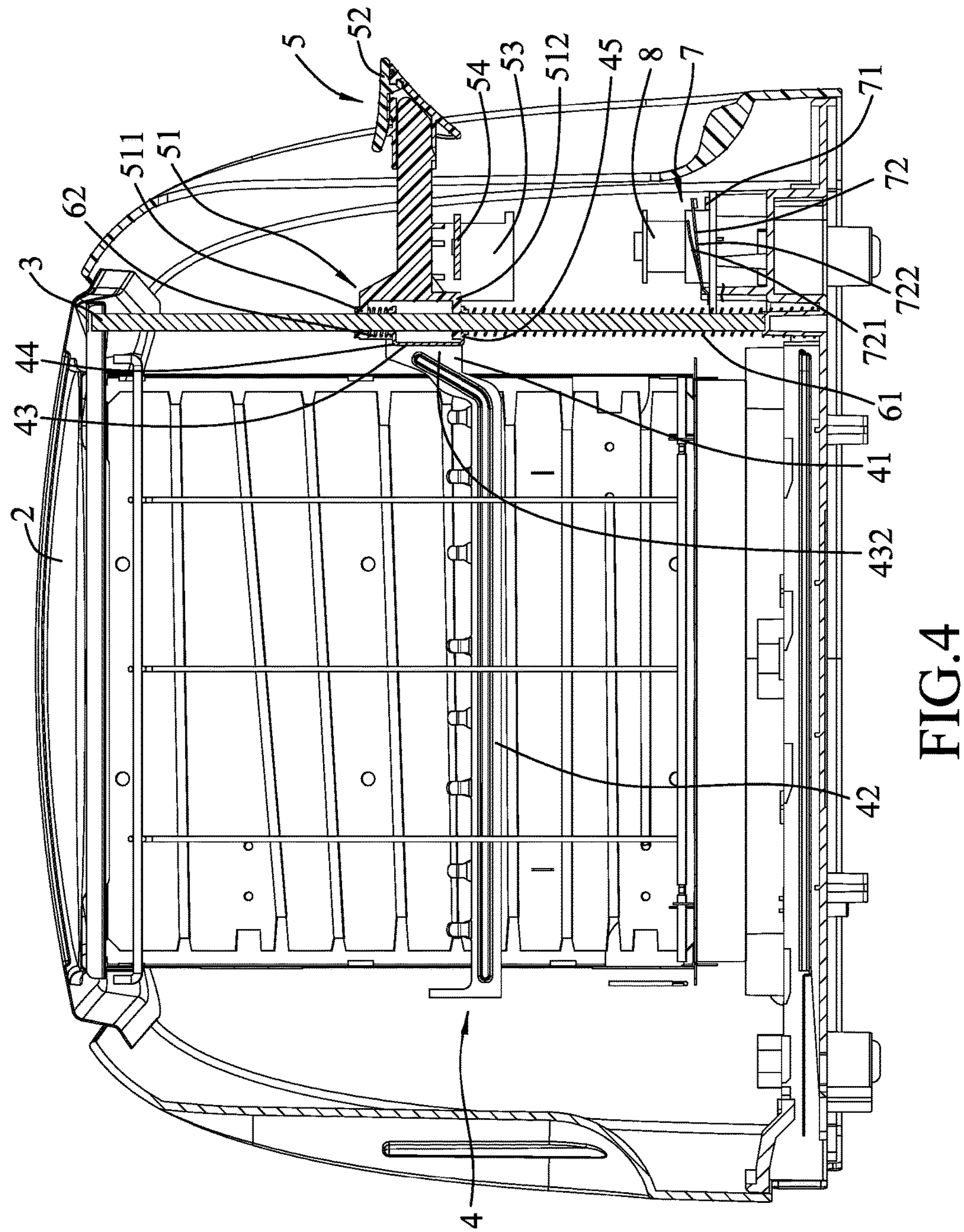
FIG. 4 is a sectional view of a toaster mounted with the embodiment.
Figure 5:
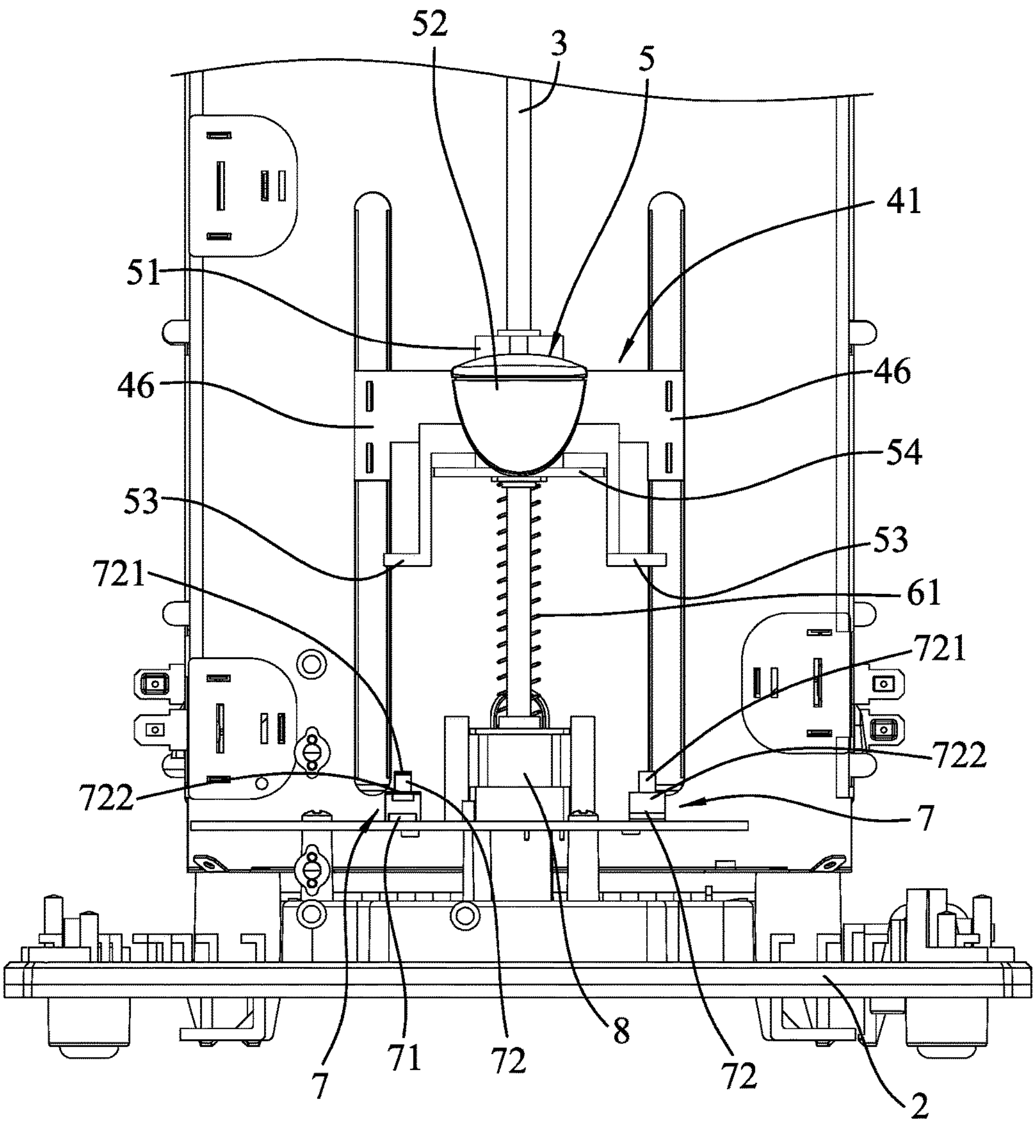
FIG. 5 is a fragmentary side view of the embodiment, illustrating a lever unit before being downwardly pressed, and a contact portion of a switch being at a shutoff position.
Figure 6:
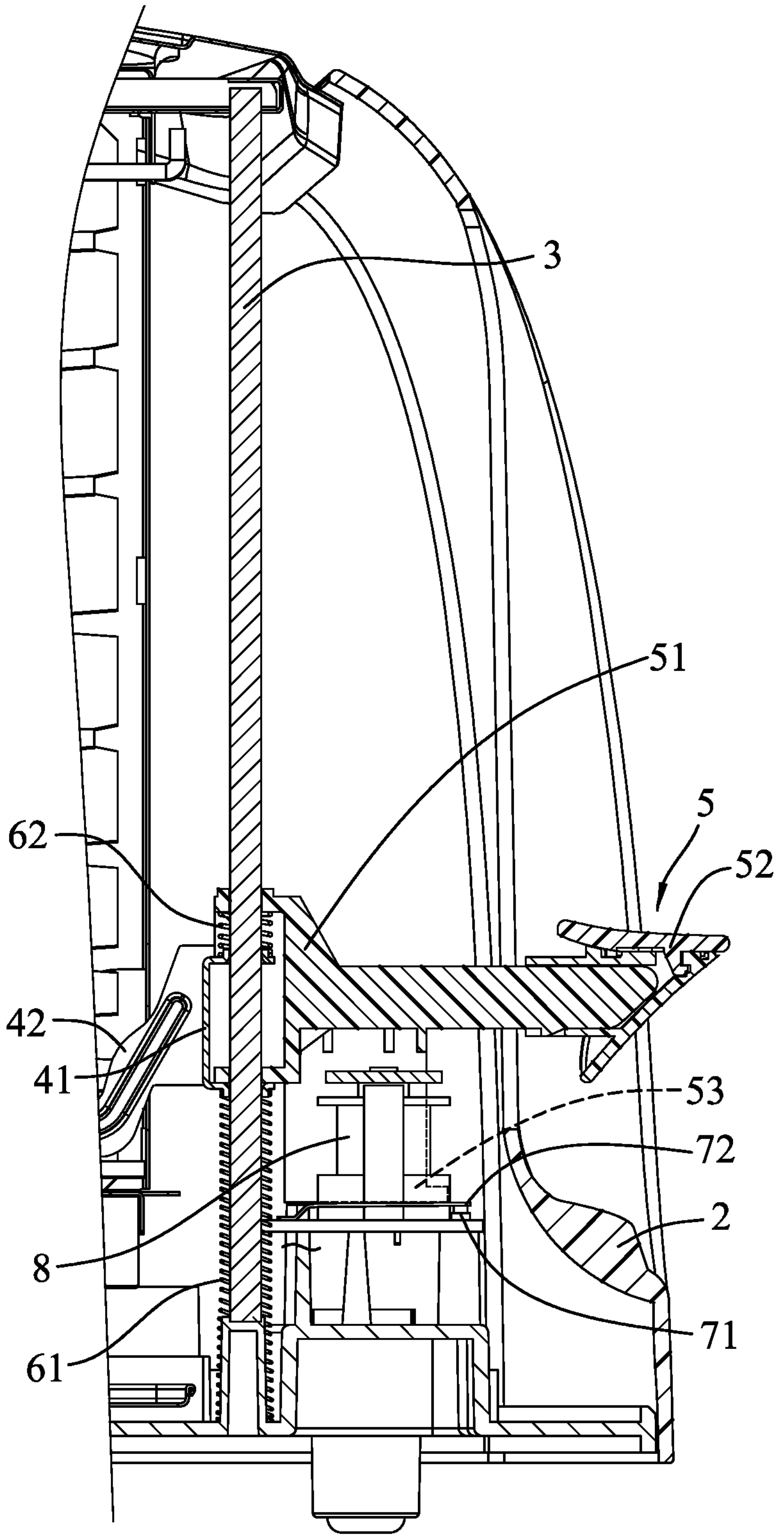
FIG. 6 is a fragmentary sectional view of the embodiment, illustrating the lever unit after being downwardly pressed, and the contact portion of the switch being at a contact position.
Figure 7:
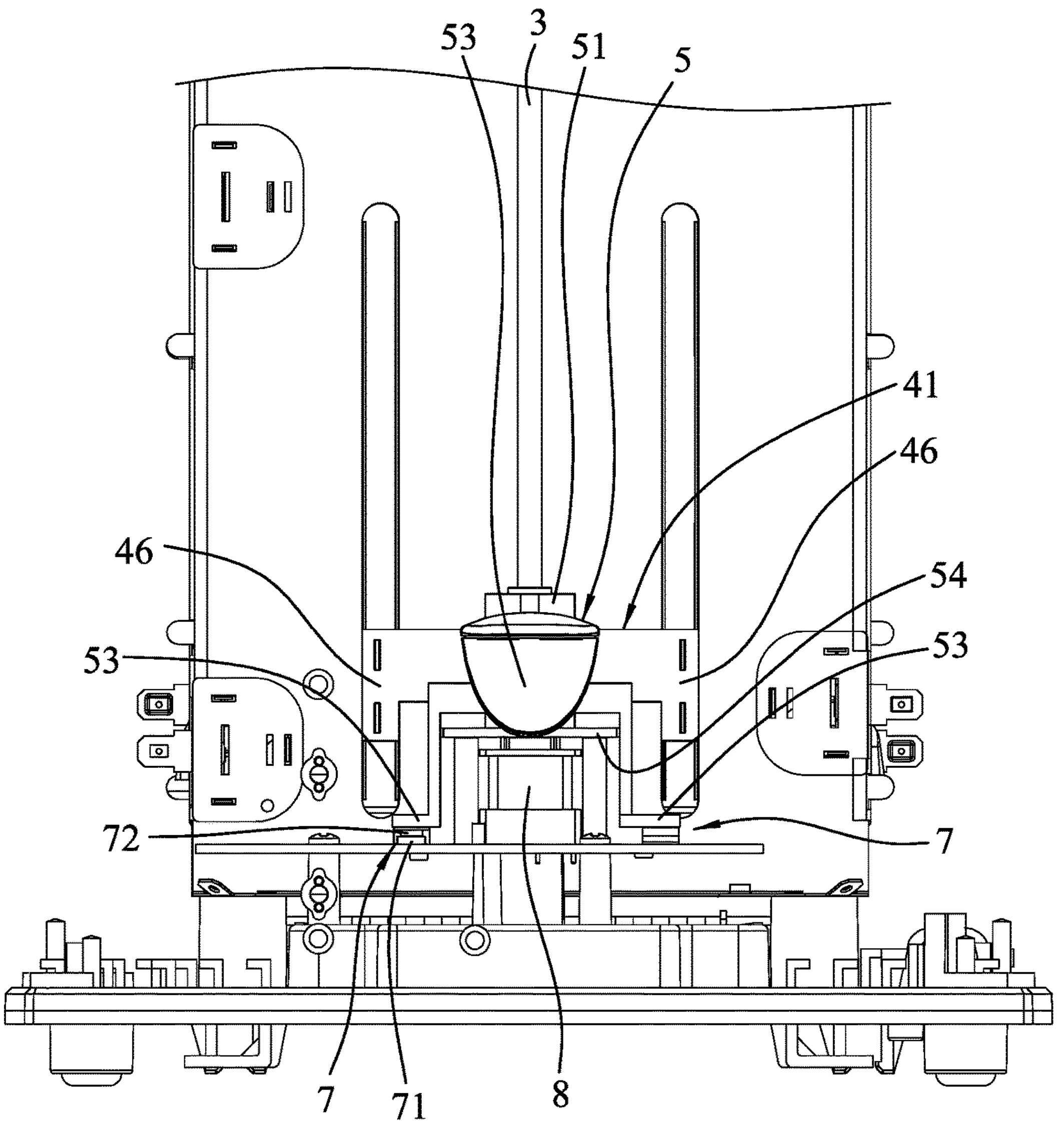
FIG. 7 is a view similar to FIG. 5, but illustrating the lever unit after being downwardly pressed, and the contact portion of the switch being at the contact position.

Referring to FIGS. 3, 6, and 7, in operation, the piece of sliced bread is disposed on the second carriage body 42, and the knob segment 52 of the lever unit 5 is then pressed downwardly by a user to drive a downward movement of the lever unit 5. During the downward movement of the lever unit 5, the upper portion 511 of the contact segment 51 compresses the second resilient member 62. Once the second resilient member 62 is fully compressed, the first carriage body 41 is driven to move downwardly together with the contact segment 51 against a resilient force of the first resilient member 61. As the lever unit 5 moves to a location adjacent to the bottom of the housing 2, the urging segments 53 of the lever unit 5 respectively contact and urge the contact portions 72 of the switches 7 to the contact position, where the contact portions 72 of the switches 7 respectively contact the conduct portions 71 of the switches 7.

At this time, the lower portion 512 of the contact segment 51 of the lever unit 5 is adjacent to the second portion 45 of the first carriage body 41, a control unit (not shown) of the toaster supplies an electric power to the electromagnet 8 to apply a magnetic force to attract the bridge segment 54 of the lever unit 5 and maintain the bread carriage 4 and the lever unit 5 at the location adjacent to the bottom of the housing 2, and a heating unit (not shown) of the toaster then applies heat to the piece of sliced bread.

Referring back to FIGS. 3, 4, and 5, when the piece of sliced bread has been toasted for a predetermined period of time, the control unit cuts the electric power off such that the lever unit 5 is no longer attracted by the electromagnet 8. At this moment, the first carriage body 41 is biased upwardly by a restoring force of the first resilient member 61 to drive an upward movement of the bread carriage 4 and the lever unit 5 to return to a location adjacent to the top of the housing 2, such that the urging segments 53 are separated respectively from the switches 7, thereby converting the contact portions 72 of the switches 7 to the shutoff position, and that the heating unit stops toasting the piece of sliced bread. During the upward movement of the lever unit 5, the upper portion 511 of the contact segment 51 is biased away from the first portion 44 of the first carriage body 41 by a restoring force of the second resilient member 62.

Figure 8:
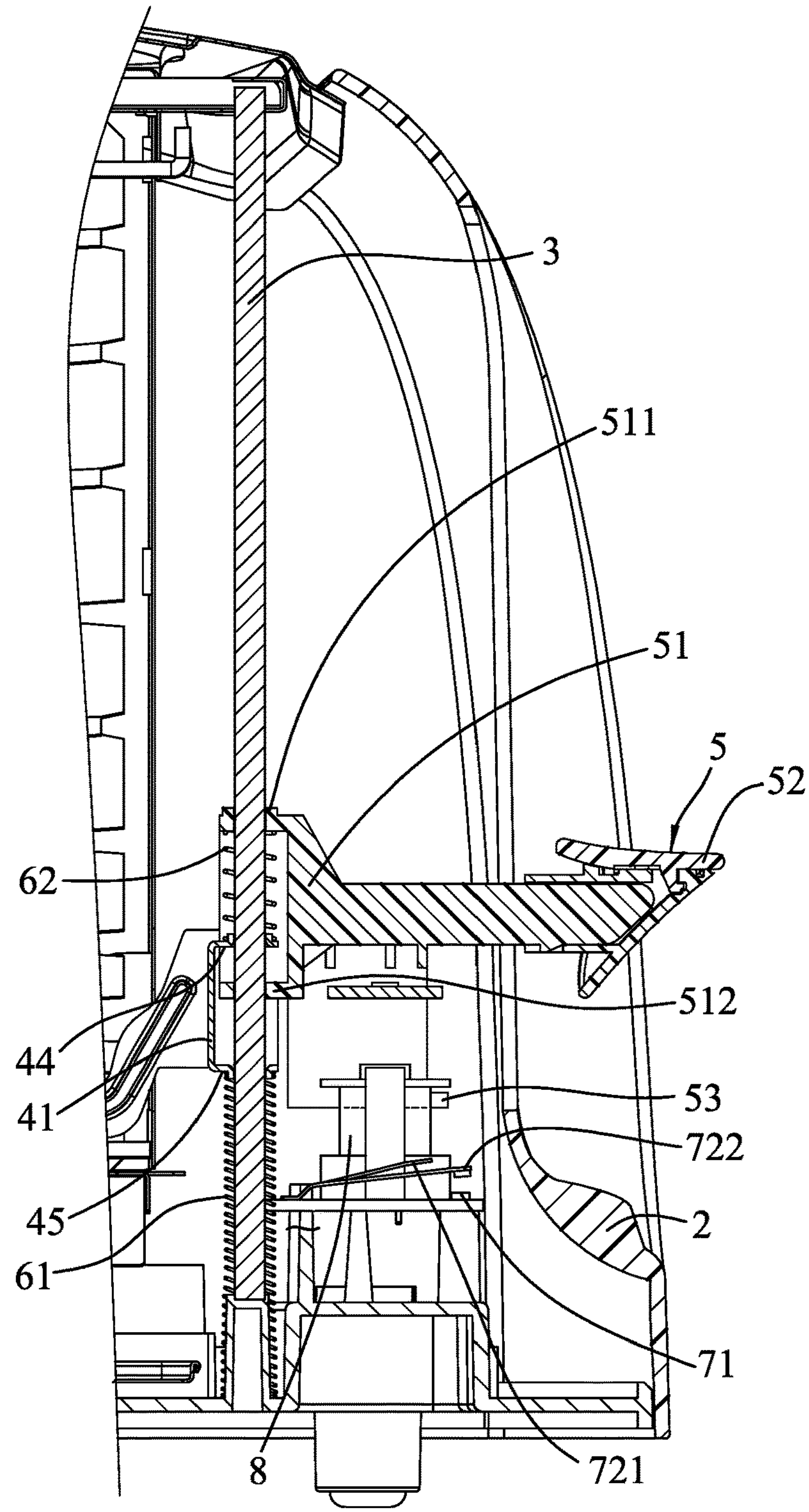
FIG. 8 is a view similar to FIG. 6, but illustrating the lever unit after being downwardly pressed, a bread carriage being stuck, and the contact portion of the switch being at the shutoff position.

Referring further to FIGS. 7 and 8, when the piece of sliced bread has been toasted for the predetermined period of time and the control unit cuts the electric power off, even if the bread carriage 4 is stuck and unable to move, the lever unit 5 will still be released from the electromagnet 8, and the contact portions 72 of the switches 7 automatically restore to the shutoff position, such that the contact segment 51 is pushed upwardly and resiliently by the contact portions 72. During the upward movement of the contact segment 51, the upper portion 511 of the contact segment 51 is away from the first portion 44 of the first carriage body 41 and the lower portion 512 of the contact segment 51 is away from the second portion 45 of the first carriage body 41. The second resilient member 62 is also released to facilitate the upward movement of the contact segment 51 so as to ensure the conversion of the switches 7 to the shutoff position to cut off the electric power. It should be noted that the second resilient member 62 may be omitted in other embodiments.

In conclusion, with the design that the upper portion 511 of the contact segment 51 is disposed above the first portion 44 of the first carriage body 41 and the lower portion 512 of the contact segment 51 is disposed between the first and second portions 44, 45 of the first carriage body 41, and that a thickness of the lower portion 512 in the up-down direction is small, the lower portion 512 of the contact segment 51 can move between the first and second portions 44, 45 and a distance for the lever unit 5 to move upwardly when being biased by the switches 7 is sufficient. As a result, the contact portions 72 of the switches 7 can successfully convert to the shutoff position to prevent sliced bread from being burnt or even a fire hazard. In addition, by virtue of the design that only the lower portion 512 of the contact segment 51 is disposed between the first and second portions 44, 45 (i.e., the upper portion 511 is disposed outside of the first carriage body 41), a sufficient space for the upward movement of the contact segment 51 is created, and the first carriage body 41 is not required to be enlarged such that the drawbacks associated with the abovementioned prior art are eliminated.

In the description above, for the purposes of explanation, numerous specific details have been set forth in order to provide a thorough understanding of the embodiment. It will be apparent, however, to one skilled in the art, that one or more other embodiments maybe practiced without some of these specific details.

It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A shutoff device adapted for use in a toaster, comprising:

a guiding unit extending in an up-down direction;

a bread carriage connected to and movable along said guiding unit, and including a first carriage body that has a first portion and a second portion spaced apart from and disposed under said first portion;

a lever unit having a contact segment that is adjacent to said first carriage body of said bread carriage, that is connected to and movable along said guiding unit, and that has a lower portion disposed between said first and second portions of said first carriage body, and an upper portion spaced apart from said lower portion and disposed above said lower portion and said first portion of said first carriage body; and a switch having a conduct portion, and a contact portion that is convertible between a contact position, where said contact portion electrically contacts said conduct portion, and a shutoff position, where said contact portion is separated from said conduct portion;

wherein said lever unit is downwardly movable to move said bread carriage downwardly, and to urge said contact portion of said switch to the contact position; and wherein said lever unit is upwardly movable relative to said bread carriage with said lower portion being moved upwardly toward said first portion of said first carriage body and with said upper portion being moved upwardly away from said first portion of said first carriage body, thereby converting said contact portion of said switch to the shutoff position.

2. The shutoff device as claimed in claim 1, wherein said lower portion of said contact segment of said lever unit is adjacent to said second portion of said first carriage body when said contact portion of said switch is at the contact position, and is away from said second portion of said first carriage body when said contact portion of said switch is at the shutoff position.

3. The shutoff device as claimed in claim 1, wherein said guiding unit is configured as a shaft extending through said upper portion of said contact segment of said lever unit, said first portion of said first carriage body, said lower portion of said contact segment of said lever unit, and said second portion of said first carriage body.

4. The shutoff device as claimed in claim 1, further comprising a first resilient member that is disposed under said first carriage body for biasing upwardly said first carriage body.

5. The shutoff device as claimed in claim 4, further comprising a second resilient member that has opposite top and bottom ends abutting resiliently and respectively against said contact segment of said lever unit and said first carriage body for biasing upwardly said lever unit relative to said bread carriage.

6. The shutoff device as claimed in claim 1, wherein said lever unit further has:

an accessible knob segment connected to said contact segment; and an urging segment connected between said contact segment and said knob segment for contacting said contact portion of said switch and urging said contact portion to the contact position.

7. The shutoff device as claimed in claim 1, wherein:

said first carriage body further has a U-shaped connecting portion having a middle section and two side sections that are connected respectively to opposite ends of said middle section and that flank said contact segment of said lever unit, and two coupling portions connected respectively to said side sections of said connecting portion and parallel to said middle section of said connecting portion;

said first and second portions of said first carriage body are connected respectively to top and bottom ends of said middle section of said connecting portion; and said bread carriage further includes two second carriage bodies, each extending from a respective one of said coupling portions of said first carriage body away from said lever unit and adapted for supporting a piece of sliced bread thereon.

* * * * *